United States Patent
Gandhi et al.

(10) Patent No.: US 11,729,689 B2
(45) Date of Patent: Aug. 15, 2023

(54) NETWORK STEERING

(71) Applicant: Cisco Technology, Inc., San Jose, CA (US)

(72) Inventors: Indermeet S. Gandhi, San Jose, CA (US); Jerome Henry, Pittsboro, NC (US); Robert E. Barton, Richmond (CA)

(73) Assignee: Cisco Technology, Inc., San Jose, CA (US)

( * ) Notice: Subject to any disclaimer, the term of this patent is extended or adjusted under 35 U.S.C. 154(b) by 82 days.

(21) Appl. No.: 17/443,297

(22) Filed: Jul. 23, 2021

(65) Prior Publication Data

US 2023/0025131 A1    Jan. 26, 2023

(51) Int. Cl.
| | |
|---|---|
| *H04W 36/22* | (2009.01) |
| *H04W 28/02* | (2009.01) |
| *H04W 28/08* | (2023.01) |
| *H04W 28/086* | (2023.01) |
| *H04W 84/12* | (2009.01) |

(52) U.S. Cl.
CPC ....... *H04W 36/22* (2013.01); *H04W 28/0289* (2013.01); *H04W 28/0819* (2020.05); *H04W 28/0958* (2020.05); *H04W 84/12* (2013.01)

(58) Field of Classification Search
CPC ..... H04W 36/16; H04W 36/22; H04W 28/02; H04W 28/0289; H04W 28/08; H04W 28/0804; H04W 28/0808; H04W 28/0819; H04W 28/09; H04W 28/0958; H04W 84/12; H04W 48/02; H04W 48/20; H04W 88/08; H04W 88/10
See application file for complete search history.

(56) References Cited

U.S. PATENT DOCUMENTS

| | | | |
|---|---|---|---|
| 11,290,916 B1* | 3/2022 | Malas | H04W 28/0858 |
| 2015/0334714 A1 | 11/2015 | Wang et al. | |
| 2015/0341840 A1* | 11/2015 | Lee | H04W 36/14 455/437 |
| 2017/0105221 A1* | 4/2017 | Ahluwalia | H04W 72/0486 |
| 2018/0131549 A1 | 5/2018 | Berardinelli et al. | |
| 2018/0279192 A1* | 9/2018 | Raissinia | H04W 28/0804 |
| 2020/0178352 A1 | 6/2020 | Cho et al. | |
| 2020/0322280 A1 | 10/2020 | Gopinathan et al. | |
| 2021/0120454 A1* | 4/2021 | Chennichetty | H04L 1/0001 |
| 2021/0250800 A1* | 8/2021 | Meredith | H04W 48/16 |
| 2021/0314818 A1* | 10/2021 | Youtz | H04W 28/0819 |
| 2022/0287042 A1* | 9/2022 | Huang | H04W 40/02 |

FOREIGN PATENT DOCUMENTS

GB    2532788 A  *  6/2016  ........... H04L 47/125

\* cited by examiner

*Primary Examiner* — Robert C Scheibel
(74) *Attorney, Agent, or Firm* — Patterson + Sheridan, LLP

(57) ABSTRACT

A method includes receiving, from a plurality of user devices, a plurality of requests to transmit over a wireless fidelity (WiFi) network and in response to determining that the WiFi network cannot support the plurality of requests, determining that a first request of the plurality of requests should be supported by a cellular network. The method also includes instructing a first user device of the plurality of user devices that communicated the first request to perform transmissions corresponding to the first request over the cellular network.

15 Claims, 3 Drawing Sheets

NETWORK STEERING

TECHNICAL FIELD

Embodiments presented in this disclosure generally relate to steering network traffic. More specifically, embodiments disclosed herein relate to steering wireless fidelity (WiFi) traffic to a cellular network.

BACKGROUND

A WiFi access point may reactively and proactively schedule uplink resources to user devices connected to the access point. As more devices connect to the access point and as more devices and users use resource intensive applications (e.g., video applications), the more resources are consumed. In dense environments, it is not uncommon for the WiFi network to reach capacity and to be unable to service connected devices.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting, other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

According to an embodiment, a method includes receiving, from a plurality of user devices, a plurality of requests to transmit over a wireless fidelity (WiFi) network and in response to determining that the WiFi network cannot support the plurality of requests, determining that a first request of the plurality of requests should be supported by a cellular network. The method also includes instructing a first user device of the plurality of user devices that communicated the first request to perform transmissions corresponding to the first request over the cellular network. Other embodiments include an apparatus that performs this method.

According to another embodiment, a method includes communicating, to an access point, a first request to transmit over a WiFi network and receiving, from the access point, an instruction to communicate over a cellular network rather than the WiFi network. The instruction is generated in response to a determination that the WiFi network cannot a plurality of requests comprising the first request. The method also includes transmitting over the cellular network rather than the WiFi network in response to the instruction. Other embodiments include an apparatus that performs this method.

Example Embodiments

This disclosure describes an access point that determines whether a WiFi network has sufficient resources to service transmissions requested by user devices. The user devices communicate advanced scheduling requests to request the access point to schedule communication resources for certain traffic flows from the user device. The access point may schedule these resources and begin monitoring their use. If network conditions change and the access point determines that the WiFi network cannot service the requested traffic flows, the access point reduces the load on the WiFi network by selecting certain requested traffic flows to offload to a cellular network. The access point then instructs one or more connected user devices to transition the selected traffic flows to the cellular network rather than the WiFi network. As a result, the load on the WiFi network lightens and the WiFi network is able to service the other requested transmissions, in particular embodiments.

Figure 1:
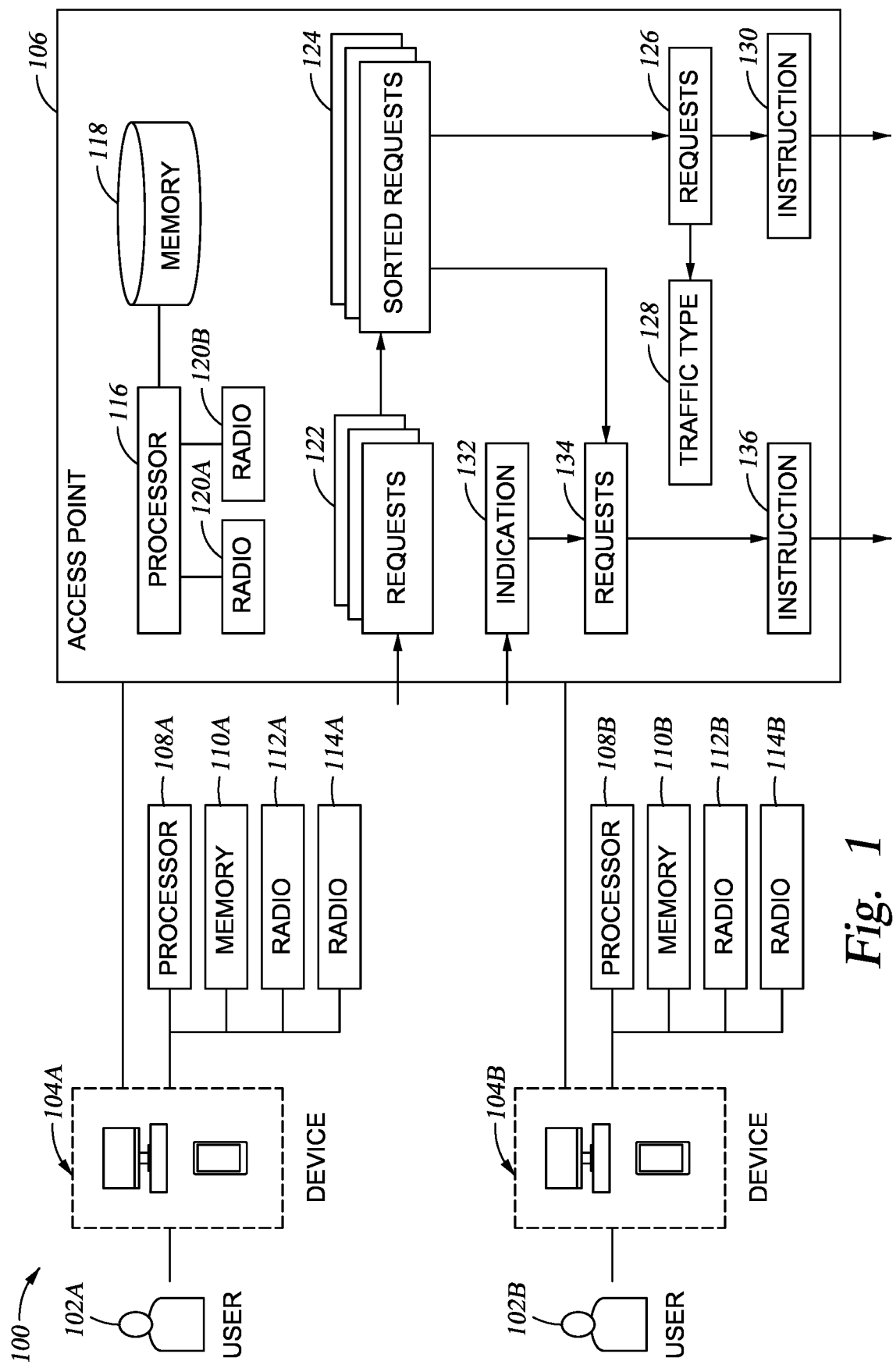
FIG. 1 illustrates an example system.

FIG. 1 illustrates an example system 100. As seen in FIG. 1, the system 100 includes one or more device 104 and an access point 106. The access point 106 provides the devices 104 access to a network. Additionally, the access point 106 schedules communication resources that the devices 104 use to transmit messages to or receive messages from the access point 106 and/or the network. For example, the access point 106 may schedule resources for a device 104 to transmit messages over a WiFi network. If the access point 106 determines that there are insufficient resources for the device 104 to transmit over the WiFi network, the access point 106 may evaluate the requested resources to determine one or more transmissions that may be offloaded from the WiFi network to a cellular network. The access point 106 then instructs the devices 104 to make these transmissions over the cellular network rather than the WiFi network. The devices 104 then perform the transmissions over the cellular network if the cellular network is available to those devices 104. As a result, the access point 106 frees up resources on the WiFi network, in particular embodiments.

Users 102 use the devices 104 to connect to the access point 106 and to transmit messages to and/or receive messages from the access point 106. Before the devices 104 transmit messages, the devices 104 request transmission resources from the access point 106. The access point 106 then schedules resources for the devices 104 according to their requests. For example, if a user 102 launches a video or voice application on the device 104, the device 104 requests transmission resources for the voice or video application. The requested resources provide a desired quality of service for the voice or video application.

The device 104 is any suitable device for communicating with components of the system 100. As an example and not by way of limitation, the device 104 may be a computer, a laptop, a wireless or cellular telephone, an electronic notebook, a personal digital assistant, a tablet, or any other device capable of receiving, processing, storing, or communicating information with other components of the system 100. The device 104 may be a wearable device such as a virtual reality or augmented reality headset, a smart watch, or smart glasses. The device 104 may also include a user interface, such as a display, a microphone, keypad, or other appropriate terminal equipment usable by the user 102. In the example of FIG. 1, the system 100 includes a device 104A and a device 104B. The devices 104A and 104B connect to the access point 106 to transmit messages to and/or receive messages from the access point 106. As seen in FIG. 1, the device 104A includes a processor 108A, a memory 110A, and radios 112A and 114A, which are configured to perform any of the actions or functions of the device 104A described herein. Additionally, the device 104B includes a processor 108B, a memory 110B and radios 112B and 114B, which are configured to perform any of the functions or actions of the device 104B described herein. For example, a software application designed using software code may be stored in the memory 110A or 110B and executed by the processor 108A and 108B to perform the functions of the device 104A or 104B.

The processor 108 is any electronic circuitry, including, but not limited to one or a combination of microprocessors, microcontrollers, application specific integrated circuits (ASIC), application specific instruction set processor (ASIP), and/or state machines, that communicatively couples to memory 110 and controls the operation of the device 104. The processor 108 may be 8-bit, 16-bit, 32-bit, 64-bit or of any other suitable architecture. The processor 108 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The processor 108 may include other hardware that operates software to control and process information. The processor 108 executes software stored on the memory 110 to perform any of the functions described herein. The processor 108 controls the operation and administration of the device 104 by processing information (e.g., information received from the devices 104, access point 106, and memory 110). The processor 108 is not limited to a single processing device and may encompass multiple processing devices.

The memory 110 may store, either permanently or temporarily, data, operational software, or other information for the processor 108. The memory 110 may include any one or a combination of volatile or non-volatile local or remote devices suitable for storing information. For example, the memory 110 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in the memory 110, a disk, a CD, or a flash drive. In particular embodiments, the software may include an application executable by the processor 108 to perform one or more of the functions described herein.

The devices 104 connect wirelessly to the access point 106 using the radios 112 and 114. In some embodiments, the radios 112 and 114 allow the device 104 to form different types of connections. For example, the radios 112A and 112B may be WiFi radios and the radios 114A and 114B may be cellular radios. The devices 104A and 104B use the radios 112A and 112B to form a WiFi connection with the access point 106. The devices 104A and 104B use the radios 114A and 114B to form a cellular connection. Each device 104 includes any suitable number of radios. Although the devices 104A and 104B include radios 112 and 114, it is understood that a device 104 in the system 100 may include fewer or more radios. For example, a device 104 may include only a WiFi radio or WiFi radios.

The access point 106 manages communication resources for the devices 104 in the system 100. When the access point 106 determines that the transmissions requested by the devices 104 may overload a network (e.g., a WiFi network), the access point 106 determines the requested transmissions that may be offloaded to a different network (e.g., a cellular network). The access point 106 then instructs the corresponding devices 104 to transition their requested transmissions to the other network. In this manner, the access point 106 reduces the load on a network in particular embodiments. As seen in FIG. 1, the access point 106 includes a processor 116, a memory 118, and radios 120A and 120B, which are configured to perform any of the functions or actions of the access point 106 described herein.

The processor 116 is any electronic circuitry, including, but not limited to one or a combination of microprocessors, microcontrollers, application specific integrated circuits (ASIC), application specific instruction set processor (ASIP), and/or state machines, that communicatively couples to memory 118 and controls the operation of the access point 106. The processor 116 may be 8-bit, 16-bit, 32-bit, 64-bit or of any other suitable architecture. The processor 116 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The processor 116 may include other hardware that operates software to control and process information. The processor 116 executes software stored on the memory 118 to perform any of the functions described herein. The processor 116 controls the operation and administration of the access point 106 by processing information (e.g., information received from the devices 104 and memory 118). The processor 116 is not limited to a single processing device and may encompass multiple processing devices.

The memory 118 may store, either permanently or temporarily, data, operational software, or other information for the processor 116. The memory 118 may include any one or a combination of volatile or non-volatile local or remote devices suitable for storing information. For example, the memory 118 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in the memory 118, a disk, a CD, or a flash drive. In particular embodiments, the software may include an application executable by the processor 116 to perform one or more of the functions described herein.

The access point 106 connects wirelessly to the devices 104 using the radios 120. In some embodiments, the radios 120 allow the access point 106 to form different types of connections. For example, the radio 120A may be a WiFi radio and the radio 120B may be a cellular radio. The access point 106 use the radio 120A to form WiFi connections with the devices 104. The access point 106 use the radio 120B to form a cellular connection. The access point 106 may include any suitable number of radios 120. For example, the access point 106 may include only a WiFi radio or WiFi radios.

In operation, the access point 106 receives requests 122 from connected devices 104. The requests 122 may be requests to transmit over a network (e.g., a WiFi network). For example, the requests 122 may include advanced scheduling requests communicated by the devices 104. Each of the requests 122 may indicate the types of transmissions requested by the devices 104 (e.g., voice, video, gaming, or augmented reality/virtual reality traffic flows) and the timing of those requested transmissions. The access point 106 analyzes the requests 122 to determine a total load on a network at particular points in time. For example, the access point 106 may determine an amount of communication resources needed at particular points in time to service each request 122. The access point 106 then sums the needed resources across the points in time to determine a total load on the network during those points in time. The access point 106 may begin directing the requested traffic flows over the WiFi network and monitor conditions on the WiFi network to determine if the WiFi network can continue to handle the traffic flows.

The access point 106 may later determine that conditions on the WiFi network have changed and that the WiFi network cannot support all of the requested traffic flows. For example, the access point 106 may determine whether the requests 122 would place too high of a load or demand on the network. The access point 106 may sum the loads or demands from each of the requests 122 to determine a total load or demand on the network. If the total load or demand exceeds a threshold, then the access point 106 determines that servicing the requests 122 would place too much of a load or demand on the network. The access point 106 may determine the threshold based on buffer status reports from the devices 104 in the system 100. The buffer status reports indicate an amount of traffic waiting for transmission at each device 104, which the access point 106 evaluates to calculate the thresholds for the WiFi network. The threshold may be near a capacity limit for the WiFi network (e.g., an upstream capacity limit or a downstream capacity limit). Thus, when the traffic flows place a load or demand on the WiFi network that nears the threshold, the access point 106 may determine that the WiFi network may not be able to handle the traffic flow soon.

In response to determining that the WiFi network cannot support all of the requested traffic flows, the access point 106 determines one or more of the requests 122 to offload to a different network. For example, the access point 106 may offload some of the requested transmissions from a WiFi network over to a cellular network. As a result, the access point 106 reduces the load on the WiFi network, which allows the WiFi network to service some of the requested transmissions. The requested transmissions that are not serviced by the WiFi network may be serviced instead by the cellular network.

The access point 106 may select the requests 122 to offload using any suitable metric. For example, the access point 106 may sort the requests 122 according to any suitable metric to produce sorted requests 124. In one embodiment, the access point 106 sorts the requests 122 based on scheduling intervals or volume requirements presented by the requests 122. In this manner, the access point 106 orders the requests 122 based on the load or demand that the requests 122 would place on a network. The access point 106 then selects the requests 122 to offload based on the sorted requests 124. For example, the access point 106 may select the request 126 based on the request's 126 position in the sorted request 124. In some embodiments, the access point 106 selects the request 126 because the position of the request 126 in the sorted requests 124 indicates that the request 126 would put the least load or demand on the network out of the sorted request 124. In some embodiments, the access point 106 selects the request 126 because the position of the request 126 in the sorted requests 124 indicates that the request 126 would put the most load or demand on the network out of the sorted request 124.

In some embodiments, the access point 106 determines a traffic type 128 indicated by the request 126. The traffic type 128 indicates the type of transmission requested by the request 126. For example, the traffic type 128 may be a 5G QoS identifier (5QI) that indicates the type of traffic being requested (e.g., video traffic or voice traffic). The access point 106 may determine that transmissions corresponding to the request 126 should be offloaded to a different network (e.g., a cellular network) in response to determining that the other network supports the traffic type 128 indicated by the request 126. For example, the access point 106 may determine whether a cellular channel of the cellular network for the traffic type 128 can support the traffic type 128 indicated by the request 126 before determining whether the request 126 should be offloaded. If the cellular network can support the traffic type 128 indicated by the request 126, then the access point 106 is allowed to select the request 126 for offloading to the cellular network. If the cellular network cannot support the traffic type 128 indicated by the request 126, the access point 106 may select a different request from the sorted request 124 to transition to the cellular network. In some embodiments, the access point 106 also communicates the traffic type 128 indicated by the request 126 to the other network to alert the other network that the traffic type 128 is being requested.

The access point 106 generates an instruction 130 and communicates the instruction 130 to the device 104 that communicated the request 126. The instruction 130 instructs the device 104 to perform transmissions requested in the request 126 over a different network. For example, if a device 104 requested transmissions over a WiFi network, the instruction 130 may instruct the device 104 to instead perform the transmissions over a cellular network rather than the WiFi network. In response, the device 104 transmits the messages over the cellular network rather than the WiFi network. As a result, the load or demand placed on the WiFi network is reduced in certain embodiments.

In some embodiments, the instruction 130 includes a time during which the device 104 should transmit over a different network. The device 104 sets a timer according to the time indicated in the instruction 130. The device 104 then transmits over the different network until the timer expires. After the timer expires, the device 104 transitions back to the WiFi network and begins transmitting messages over the WiFi network. As a result, the access point 106 controls the load or demand on the WiFi network for controlled periods of time.

In certain embodiments, the device 104 may not be capable of communicating over a cellular network. For example, the device 104 may not include a cellular radio. The device 104 instead transmits messages to the access point 106 over a WiFi connection. The access point 106 then relays the transmitted messages over the cellular network on behalf of the device 104. For example, the access point 106 may receive the messages over a WiFi connection using the radio 120A and then transmit the messages over a cellular connection using the radio 120B on behalf of the device 104. As a result, the access point 106 lightens the load on the WiFi network even if the device 104 cannot communicate over a cellular network.

In particular embodiments, the access point 106 receives an indication 132 from the device 104 that alerts the access point 106 that the cellular network is unavailable to the device 104. For example, the device 104 may be in a location where cellular coverage is weak or nonexistent. In response, the access point 106 selects another request 134 from the sorted requests 124 to transition to the cellular network. The request 134 may have been communicated by another device 104 in the system 100 and may place a lighter load or demand on the WiFi network than the request 126. For example, the request 134 may be lower than the request 126 in the sorted request 124. The access point 106 generates and communicates an instruction 136 to the device 104 that communicated the request 134. That device 104 then transitions transmissions corresponding to the request 134 from the WiFi network to the cellular network. In this manner, the access point 106 can still reduce the load or demand on the WiFi network even when a cellular network is not available to certain devices 104.

As an example operation, the device 104 may begin by connecting over a WiFi connection to the access point 106 and indicate to the access point 106 that the device 104 supports cellular connectivity (e.g., over a private cellular connection). When the device 104 needs to transmit a low latency, high priority flow (e.g., voice, video, gaming, or augmented reality/virtual reality application), the device 104 communicates a request 122 (e.g., an advanced scheduling request) to the access point 106 to alert the access point 106 that additional resources should be scheduled for the device in the future. The advanced scheduling request may include characteristics such as the periodicity of the traffic, the traffic bitrate, and latency and jitter requirements. These characteristics may be express in compact form (e.g., trigger level, allocation rate, or priority level). The device 104 may communicate a separate advanced scheduling request for each flow (e.g., one for a voice flow, one for a video flow, etc.). The access point 106 then determines if it is possible to meet the traffic characteristics in a reliable way. For example, the access point 106 may evaluate channel utilization, queue depth, or traffic schedules. If the access point 106 can support the requested flow, the access point 106 establishes a session over WiFi with the device 104 for the flow. The access point 106 then monitors for when the channel for the traffic flow is near capacity (e.g., by observing traffic schedules).

The access point 106 may determine that conditions on the WiFi network have changed and that the load or demand placed on the WiFi network by certain traffic flows is nearing a threshold. The access point 106 may determine the threshold based on buffer status reports from the devices 104 in the system 100. The buffer status reports indicate an amount of traffic waiting for transmission at each device 104, which the access point 106 evaluates to calculate the thresholds for the WiFi network. The threshold may be near a capacity limit for the WiFi network (e.g., an upstream capacity limit or a downstream capacity limit). Thus, when the traffic flows place a load or demand on the WiFi network that nears the threshold, the access point 106 may determine that the WiFi network may not be able to handle the traffic flow soon.

In response, the access point 106 evaluates the requested traffic flows from the devices 104 to determine which traffic flows to offload to a cellular network (e.g., a private 5G network). For example, the access point 106 may sort the requested traffic flows based on their scheduling intervals or volume requirements to produce sorted requests 124. The access point 106 then iteratively selects requests 126 from the sorted requests 124 to offload to the cellular network until the load or demand on the WiFi network is reduced to an acceptable level (e.g., to a level where the WiFi network is capable of handling the remaining traffic flows).

The access point 106 may map the selected requests 126 to a traffic type 128 label, such as a 5QI value that identifies the type of traffic requested by the selected request 126. For example, the access point 106 may map voice traffic to a 5QI value of 1. If the traffic type 128 does not map directly to a 5QI value (e.g., there may be many different 5QI values for video traffic), then the access point 106 may map the latency and jitter sensitivity along with the periodicity and traffic bitrate expressed in the advanced scheduling request for the requested traffic flow to a 5QI value for certain performance objectives (e.g., latency). In some embodiments, the device 104 communicates the 5QI values in advanced scheduling requests to the access point 106 over WiFi. The access point 106 then relays the 5QI values to a cellular network (e.g., 5G network).

The access point 106 then evaluates whether the cellular network can handle the traffic flow that was selected for offloading. For example, the access point 106 may evaluate the queue or buffer status of the corresponding 5QI in the cellular network. If the queue or buffer is underutilized, then the access point 106 may direct the traffic flow to the cellular network. The access point 106 then communicates the instruction 130 to the device 104 to instruct the device 104 to transition the requested traffic flow to the cellular network. If the 5G QoS bearer is already established, then the device 104 begins communicating traffic over the QoS bearer. Otherwise, the device 104 establishes a session with the requested QoS. In some embodiments, the device 104 may determine that the cellular network is not available. For example, the device 104 may not be able to obtain the needed bearer on the cellular network. The device 104 then sends the indication 132 (e.g., an advanced scheduling request) to the access point 106 to inform the access point 106 that the cellular network is not available. The access point 106 then selects another request 134 from the sorted requests 124 to offload to the cellular network. As a result, the access point 106 reduces the load or demand placed on the WiFi network.

Figure 2:
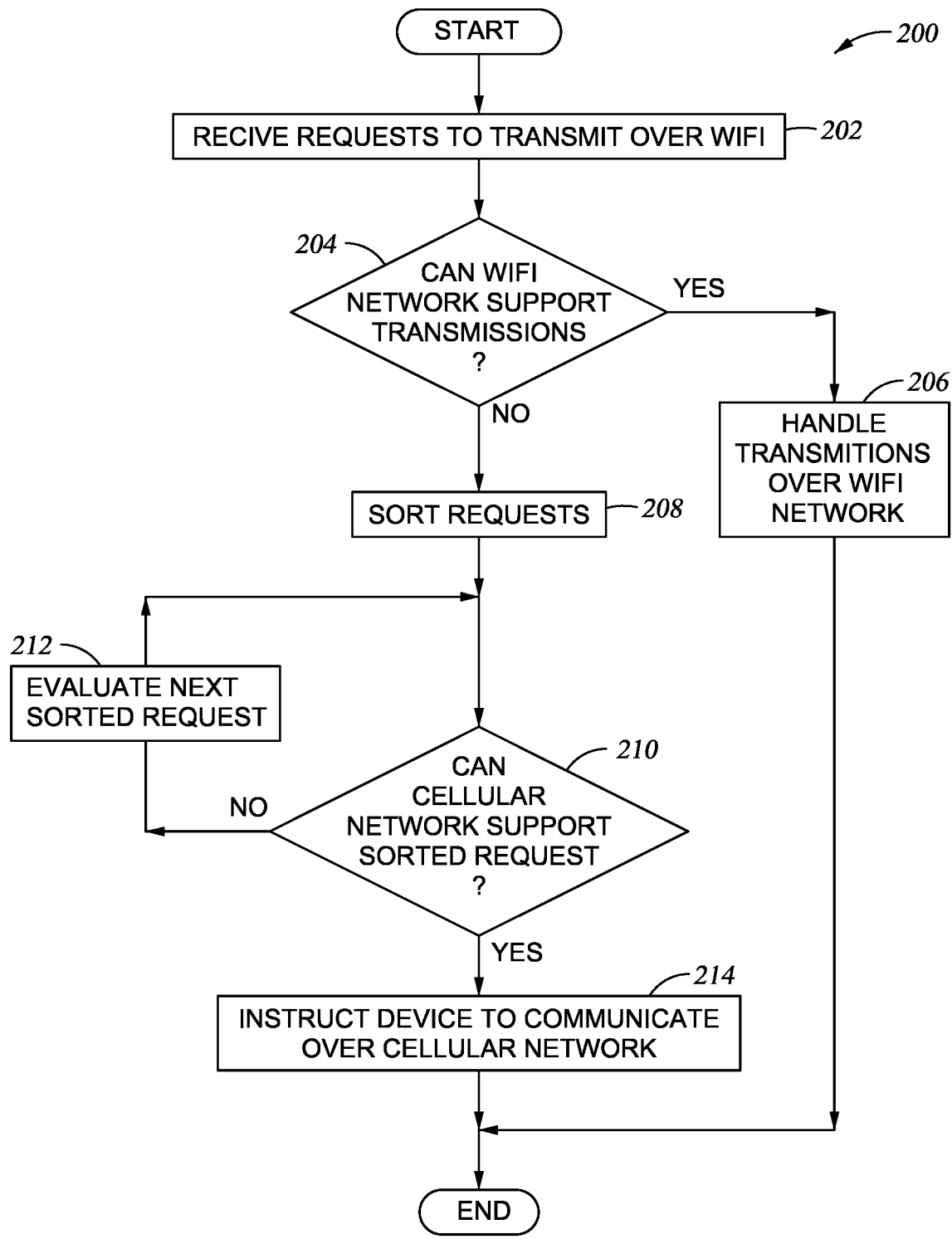
FIG. 2 is a flowchart of an example method performed in the system of FIG. 1.

FIG. 2 is a flowchart of an example method 200 performed in the system 100 of FIG. 1. In one embodiment, the access point 106 performs the method 200. In particular embodiments, by performing the method 200, the access point 106 reduces the load or demand on a WiFi network.

The access point 106 begins by receiving requests 122 to transmit over the WiFi network in block 202. The requests 122 may be communicated by one or more devices 104 in the system 100. In block 204, the access point 106 determines whether the WiFi network can support the requested transmissions. For example, the access point 106 may sum the demand or load of each individual request 122 to determine a total load or demand placed on the WiFi network if all requests 122 were serviced by the WiFi network. If the total load or demand exceeds a threshold, then the access point 106 determines that the WiFi network cannot service all of the requests 122. If the total load or demand is below the threshold, then the access point 106 determines that the WiFi network can service all of the requests 122.

If the WiFi network can service all of the requests 122, the access point 106 handles the requested transmissions over the WiFi network in block 206. If the WiFi network cannot service all of the requests 122, then the access point 106 sorts the requests 122 in block 208 to produce the sorted requests 124. The access point 106 then analyzes the sorted requests 124 according to any suitable metric to determine which of the sorted requests 124 should be transitioned from the WiFi network to a cellular network. For example, the access point 106 may sort the requests 122 according to scheduling intervals or volume requirements of the requests 122. The access point 106 then analyzes the sorted requests 124 to determine which of the sorted requests 124 should be offloaded from the WiFi network to the cellular network. For example, the access point 106 may start its analysis with the sorted requests 124 that would place the highest load or demand on the WiFi network. As another example, the access point 106 may start its analysis with the sorted requests 124 that would place the lowest load or demand on the WiFi network.

While analyzing the sorted requests 124, the access point 106 determines whether the cellular network can support a sorted request 124 in block 210. If the cellular network cannot support the sorted request 124, then the access point 106 evaluates the next sorted request 124 in block 212. In some embodiments, the access point 106 determines whether the cellular network can support a sorted request 124 by evaluating whether the cellular network can support a traffic type 128 indicated by the sorted request 124. For example, the traffic type 128 may be a 5G QoS identifier (5QI) that indicates the type of traffic being requested (e.g., video traffic or voice traffic). The access point 106 may determine whether a cellular channel of the cellular network for the traffic type 128 can support the traffic type 128 indicated by the request 126 (e.g., if the channel is not overloaded and can handle the offloaded traffic) before determining whether the request 126 should be offloaded (e.g., if the channel is not overloaded and can handle the offloaded traffic).

If the cellular network can support the sorted request 124, then the access point 106 instructs a device 104 that communicated the sorted request 124 to transmit messages corresponding to the sorted request 124 over the cellular network rather than the WiFi network in block 214. The device 104 may then transition the transmissions corresponding into the sorted request 124 over to the cellular network, which reduces the load or demand on the WiFi network in particular embodiments.

In some embodiments, the access point 106 offloads transmissions to the cellular network iteratively until the access point 106 determines that the WiFi network can service the remaining requests. After offloading the sorted request 124 to the cellular network, the access point 106 returns to block 204 to determine whether the WiFi network can support the remaining sorted requests 124. If the WiFi network cannot support the remaining sorted requests 124, the access point 106 selects another sorted request 124 to offload in blocks 210, 212, and 214. This process repeats until the WiFi network can support the remaining sorted requests 124 that have not been offloaded.

Figure 3:
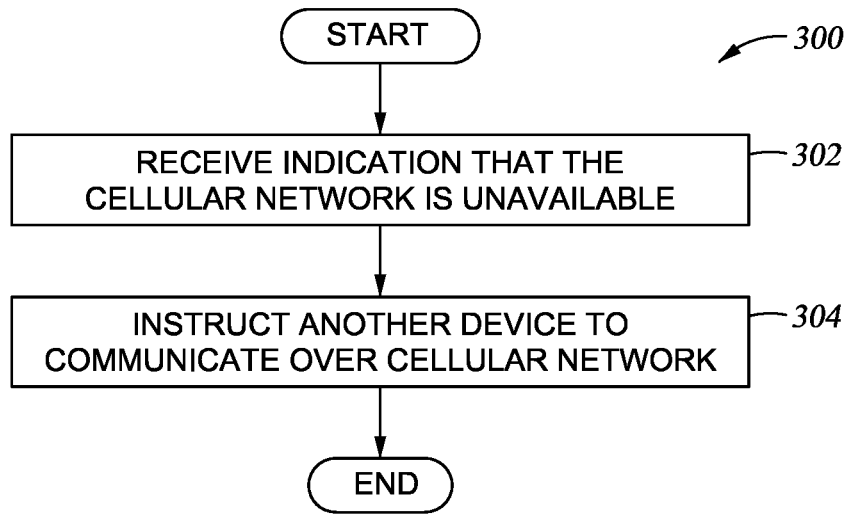
FIG. 3 is a flowchart of an example method performed in the system of FIG. 1.

FIG. 3 is a flowchart of an example method 300 performed in the system 100 of FIG. 1. In one embodiment, the access point 106 performs the method 300. In particular embodiments, by performing the method 300, the access point 106 reduces the load or demand on a WiFi network even when a cellular network is unavailable for a device 104. The method 300 may be performed after the method 200 of FIG. 2.

In block 302, the access point 106 receives an indication 132 that the cellular network is unavailable to a device 104. The access point 106 may have previously instructed the device 104 to transition certain transmissions from the WiFi network to the cellular network. The device 104 may attempt to transition these transmissions over to the cellular network and determine that the cellular network is unavailable. For example, the device 104 may be in a location with poor cellular coverage. As another example, the device 104 may be asked to offload a certain traffic type (e.g., voice or video traffic) and the cellular channel that handles that traffic type may be overloaded. The device 104 then communicates the indication 132 to the access point 106.

In block 304, the access point 106 instructs another device 104 to communicate over the cellular network. The access point 106 determines another request 134 from the sorted requests 124. The access point 106 then identifies a device 104 that communicated the other request 134. The access point 106 generates an instruction 136 to transition transmissions corresponding to the other request 134 to the cellular network. The access point 106 then communicates the instruction 136 to the other device 104. The other device 104 then transitions the transmissions from the WiFi network over to the cellular network. As a result, the load or demand on the WiFi network is reduced even though the cellular network was not available to a device 104.

Figure 4:
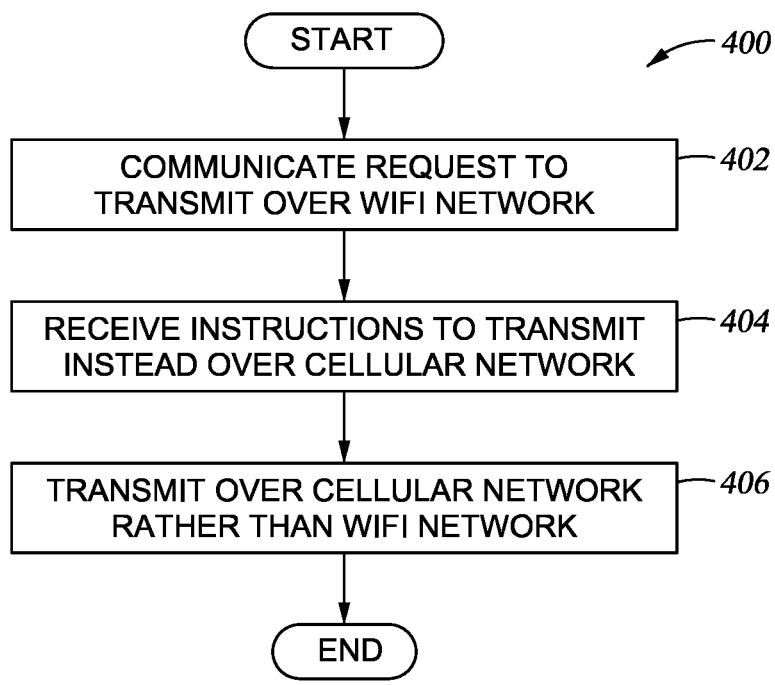
FIG. 4 is a flowchart of an example method performed in the system of FIG. 1.

FIG. 4 is a flowchart of an example method 400 performed in the system 100 of FIG. 1. In one embodiment, the device 104 performs the method 400. In particular embodiments, by performing the method 400, the device 104 reduces the load or demand on a WiFi network.

In block 402, the device 104 communicates a request 122 to transmit over the WiFi network. The access point 106 evaluates the request 122 along with requests 122 from other devices 104 in the system 100 to determine a total load or demand placed on the WiFi network if the WiFi network were to service all of the requests 122. The access point 106 may then determine that the WiFi network does not have sufficient resources to service all of the requests 122. In response, the access point 106 selects one or more of the requests 122 to transition over to a cellular network. The access point 106 then communicates an instruction 130 to the devices 104 of the selected requests 122.

In block 404, the device 104 receives the instruction 130 to transmit over the cellular network rather than the WiFi network. In response to the instruction 130, the device 104 transmits over the cellular network rather than the WiFi network in block 406. In some embodiments, the device's 104 transmissions over the cellular network are limited to the transmissions requested in the requests 122 communicated by the device 104. In some embodiments, the instruction 130 includes a time during which the device 104 should transmit messages over the cellular network. The device 104 sets a timer according to the time indicated in the instruction 130. The device 104 then transmits over the cellular network until the timer expires. After the timer expires, the device 104 transitions back to transmit messages over the WiFi network rather than the cellular network.

In summary, an access point 106 that determines whether a WiFi network has sufficient resources to service transmissions requested by user devices 104. The user devices 104 communicate advanced scheduling requests to request the access point 106 to schedule communication resources for certain traffic flows from the user device 104. The access point 106 may schedule these resources and begin monitoring their use. If network conditions change and the access point 106 determines that the WiFi network cannot service the requested traffic flows, the access point 106 reduces the load on the WiFi network by selecting certain requested traffic flows to offload to a cellular network. The access point 106 then instructs one or more connected user devices 104 to transition the selected traffic flows to the cellular network rather than the WiFi network. As a result, the load on the WiFi network lightens and the WiFi network is able to service the other requested transmissions, in particular embodiments.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function (s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method comprising:
 receiving, from a plurality of user devices, a plurality of requests to transmit over a wireless fidelity (WiFi) network;
 in response to determining that the WiFi network cannot support the plurality of requests, identifying a first request of the plurality of requests and a second request of the plurality of requests as candidates for offloading to a cellular network;
 in response to determining that the cellular network cannot support a first traffic type indicated by the first request, identifying a third request of the plurality of requests as a candidate for offloading to the cellular network; and in response to determining that the cellular network can support a second traffic type indicated by the second request different from the first traffic type and a third traffic type indicated by the third request different from the first traffic type and the second traffic type, instructing a first user device of the plurality of user devices that communicated the second request and a second user device of the plurality of user devices that communicated the third request to perform transmissions corresponding to the second request and the third request over the cellular network.

2. The method of claim 1, further comprising sorting the plurality of requests according to one or more of scheduling intervals or volume requirements of the plurality of requests to produce sorted requests, wherein identifying the third request as the candidate is based on a position of the third request in the sorted requests.

3. The method of claim 1, wherein identifying the third request as the candidate comprises determining that a cellular channel of the cellular network for the third traffic type can support the third request.

4. The method of claim 1, further comprising:
receiving, from the first user device, an indication that the cellular network is unavailable to the first user device; and
in response to the indication, instructing the second user device to perform transmissions corresponding to the third request over the cellular network.

5. The method of claim 4, wherein the transmissions corresponding to the third request present less demand on the WiFi network than the transmissions corresponding to the second request.

6. An access point comprising:
a memory; and
a hardware processor communicatively coupled to the memory, the hardware processor configured to:
receive, from a plurality of user devices, a plurality of requests to transmit over a WiFi network;
in response to determining that the WiFi network cannot support the plurality of requests, identify a first request of the plurality of requests and a second request of the plurality of requests as candidates for offloading to a cellular network;
in response to determining that the cellular network cannot support a first traffic type indicated by the first request, identify a third request of the plurality of requests as a candidate for offloading to the cellular network; and
in response to determining that the cellular network can support a second traffic type indicated by the second request different from the first traffic type and a third traffic type indicated by the third request different from the first traffic type and the second traffic type, instruct a first user device of the plurality of user devices that communicated the second request and a second user device of the plurality of user devices that communicated the third request to perform transmissions corresponding to the second request and the third request over the cellular network.

7. The access point of claim 6, the hardware processor further configured to sort the plurality of requests according to one or more of scheduling intervals or volume requirements of the plurality of requests to produce sorted requests, wherein identifying the third request as the candidate is based on a position of the third request in the sorted requests.

8. The access point of claim 6, wherein identifying the third request as the candidate comprises determining that a cellular channel of the cellular network for the third traffic type can support the third request.

9. The access point of claim 6, the hardware processor further configured to:
receive, from the first user device, an indication that the cellular network is unavailable to the first user device; and
in response to the indication, instruct the second user device to perform transmissions corresponding to the third request over the cellular network.

10. The access point of claim 9, wherein the transmissions corresponding to the third request present less demand on the WiFi network than the transmissions corresponding to the second request.

11. A method comprising:
in response to determining that a WiFi network cannot support a plurality of requests received from a plurality of user devices, identifying a first request of the plurality of requests as a candidate for offloading to a cellular network;
in response to determining that the cellular network cannot support a first traffic type indicated by the first request, identifying a second request of the plurality of requests as a candidate for offloading to the cellular network; and
in response to determining that the cellular network can support a second traffic type indicated by the second request different from the first traffic type, instructing a user device of the plurality of user devices that communicated the second request to perform transmissions corresponding to the second request over the cellular network.

12. The method of claim 11, further comprising sorting the plurality of requests according to one or more of scheduling intervals or volume requirements of the plurality of requests to produce sorted requests, wherein identifying the second request as the candidate is based on a position of the second request in the sorted requests.

13. The method of claim 11, further comprising communicating the first traffic type to the cellular network.

14. The method of claim 11, wherein the user device reverts to transmitting over the WiFi network in response to a timer expiring.

15. The method of claim 14, further comprising communicating a time to the user device, wherein the timer is set according to the time.

* * * * *